US009030720B2

(12) United States Patent
Omoya

(10) Patent No.: US 9,030,720 B2
(45) Date of Patent: May 12, 2015

(54) SHEET CONVEYING DEVICE, IMAGE READING APPARATUS, IMAGE FORMING APPARATUS

(71) Applicant: KYOCERA Document Solutions Inc., Osaka-shi, Osaka (JP)

(72) Inventor: Shinichi Omoya, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/288,248

(22) Filed: May 27, 2014

(65) Prior Publication Data
US 2014/0355083 A1 Dec. 4, 2014

(30) Foreign Application Priority Data

May 31, 2013 (JP) .................. 2013-115509

(51) Int. Cl.
*H04N 1/04* (2006.01)
*B65H 7/14* (2006.01)
*B65H 7/20* (2006.01)
*B65H 9/00* (2006.01)
*H04N 1/00* (2006.01)
*H04N 1/387* (2006.01)

(52) U.S. Cl.
CPC .. *B65H 7/14* (2013.01); *B65H 7/20* (2013.01); *B65H 9/00* (2013.01); *H04N 1/00588* (2013.01); *H04N 1/3878* (2013.01)

(58) Field of Classification Search
CPC .............. H04N 1/00602; H04N 1/193; H04N 1/00681; H04N 1/0057; H04N 1/00588; H04N 1/121; H04N 1/00748; H04N 1/00737; H04N 1/1017

USPC .......... 358/498, 496, 488, 486, 747; 399/361, 399/367, 371, 372
See application file for complete search history.

(56) References Cited

U.S. PATENT DOCUMENTS

| | | | | |
|---|---|---|---|---|
| 6,997,455 | B2* | 2/2006 | Romine | 271/227 |
| 7,832,726 | B2* | 11/2010 | Osakabe | 271/261 |
| 7,959,151 | B2* | 6/2011 | Fukube | 271/258.01 |
| 8,256,767 | B2* | 9/2012 | Williams et al. | 271/228 |
| 8,430,398 | B2* | 4/2013 | Kamichi | 271/171 |
| 2005/0175386 | A1* | 8/2005 | Romine | 400/579 |
| 2014/0210152 | A1* | 7/2014 | Kakuta et al. | 271/3.16 |

FOREIGN PATENT DOCUMENTS

JP      2000101777 A      4/2000

* cited by examiner

*Primary Examiner* — Cheukfan Lee
(74) *Attorney, Agent, or Firm* — Alleman Hall McCoy Russell & Tuttle LLP

(57) ABSTRACT

In a sheet conveying device, a first sensing portion is configured to output a first sense signal when a sheet is absent at a first sensing position determined in advance on a sheet placement portion, and output a second sense signal when the sheet is present at the first sensing position. A second sensing portion is configured to output the second sense signal when the sheet is absent at a second sensing position separated from the first sensing position in a width direction perpendicular to a conveying direction of the sheet, and output the first sense signal when the sheet is present at the second sensing position. A sensing control portion is configured to sense a plurality of states in accordance with a combination of the first sense signal and the second sense signal.

12 Claims, 7 Drawing Sheets

FIG. 4

|  | FIRST SENSING PORTION | SECOND SENSING PORTION |
|---|---|---|
| SHEET IS ABSENT | ON | OFF |
| SHEET IS PRESENT | OFF | ON |
| COVER MEMBER IS OPEN | ON | ON |

SHEET CONVEYING DEVICE, IMAGE READING APPARATUS, IMAGE FORMING APPARATUS

INCORPORATION BY REFERENCE

This application is based upon and claims the benefit of priority from the corresponding Japanese Patent Application No. 2013-115509 filed on May 31, 2013, the entire contents of which are incorporated herein by reference.

BACKGROUND

The present disclosure relates to a sheet conveying device, an image reading apparatus, and an image forming apparatus, each of which capable of sensing a tilt of a sheet.

An image reading apparatus is known which includes a sheet conveying device configured to convey a document sheet, and reads image data from the document sheet conveyed by the sheet conveying device. In this type of image reading apparatuses, document sheets are sometimes conveyed by the sheet conveying device in a tilted state with respect to a conveying direction. In such a case, a tilt also occurs in a content of the image data read from the document sheet.

On the other hand, a technology is known for sensing a tilt of a document sheet in accordance with a difference in the time of sensing of the presence of a document sheet by two sensors arranged separately in a direction orthogonal to the conveying direction of the document sheet.

SUMMARY

A sheet conveying device according to one aspect of the present disclosure includes a sheet placement portion, a conveyance member, a cover member, a first sensing portion, a second sensing portion, and a sensing control portion. The sheet placement portion is where a sheet is to be placed. The conveyance member is configured to convey a sheet placed on the sheet placement portion. The cover member is a member that can be opened or closed, and is configured to cover the conveyance member. The first sensing portion is configured to output a first sense signal when the sheet is absent at a first sensing position determined in advance on the sheet placement portion. In addition, the first sensing portion is configured to output a second sense signal when the sheet is present at the first sensing position. In addition, the first sensing portion is configured to output the first sense signal in response to an open state of the cover member. The second sensing portion is configured to output the second sense signal when the sheet is absent at a second sensing position separated from the first sensing position in a width direction perpendicular to the conveying direction of the sheet. In addition, the second sensing portion is configured to output the first sense signal when the sheet is present at the second sensing position. Furthermore, the second sensing portion is configured to output the first sense signal in response to the open state of the cover member. The sensing control portion is configured to sense the open state of the cover member and a tilt of the sheet conveyed by the conveyance member, based on a combination of the first sense signal and the second sense signal outputted from the first sensing portion and the second sensing portion.

A sheet conveying device according to another aspect of the present disclosure includes a sheet placement portion, a conveyance member, a first sensing portion, a second sensing portion, and a sensing control portion. The sheet placement portion is where a sheet is to be placed. The conveyance member is configured to convey a sheet placed on the sheet placement portion. The first sensing portion is configured to output a first sense signal when the sheet is absent at a first sensing position determined in advance on the sheet placement portion. In addition, the first sensing portion is configured to output a second sense signal when the sheet is present at the first sensing position. The second sensing portion is configured to output the second sense signal when the sheet is absent at a second sensing position separated from the first sensing position in a width direction perpendicular to the conveying direction of the sheet. In addition, the second sensing portion is configured to output the first sense signal when the sheet is present at the second sensing position. The sensing control portion is configured to sense a plurality of states in accordance with a combination of the first sense signal and the second sense signal outputted from the first sensing portion and the second sensing portion.

An image reading apparatus according to another aspect of the present disclosure includes the sheet conveying device and an image reading portion. The image reading portion is configured to read image data from a sheet conveyed by the sheet conveying device.

An image forming apparatus according to another aspect of the present disclosure includes the sheet conveying device and an image forming portion. The image forming portion is configured to form an image based on image data.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 shows one example of a combination of sense signals from the first sensing portion and the second sensing portion included in the multifunction peripheral shown in FIG. 1A.

DETAILED DESCRIPTION

In the following, embodiments of the present disclosure will be described with reference to the accompanying drawings in order to allow understanding of the present disclosure. It should be noted that the following embodiments are examples embodying the present disclosure, and, by nature, do not limit the technical scope of the present disclosure.

<Schematic Configuration of Multifunction Peripheral 10>

Figure 1A:
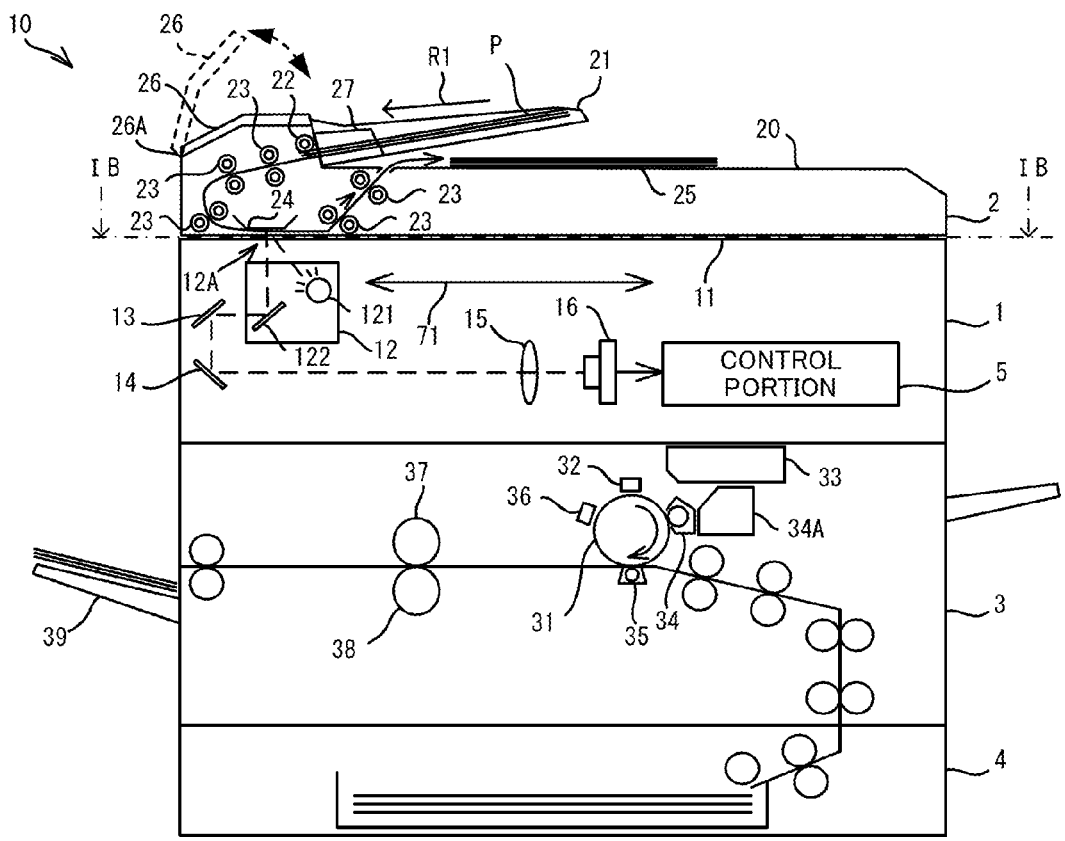
FIG. 1A is a schematic configuration diagram of a multifunction peripheral according to an embodiment of the present disclosure.
Figure 1B:
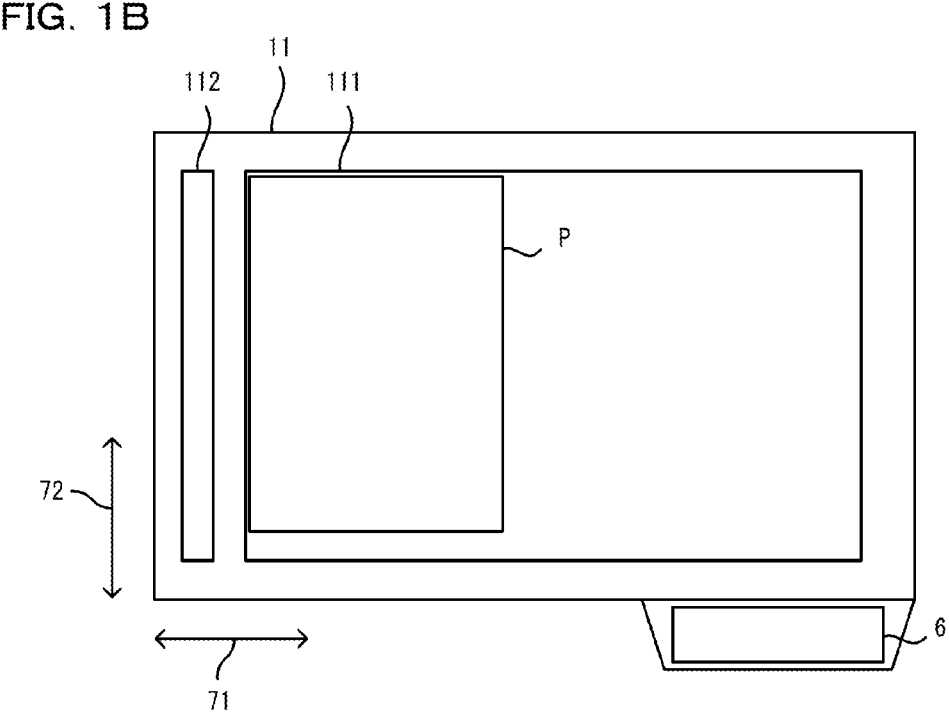
FIG. 1B is a schematic configuration diagram of the multifunction peripheral according to the embodiment of the present disclosure.

First, a schematic configuration of a multifunction peripheral 10 according to an embodiment of the present disclosure will be described with reference to FIG. 1A and FIG. 1B. FIG. 1A is a schematic cross sectional view of the multifunction peripheral 10, and FIG. 1B is a view as seen from the direction of arrows IB-IB in FIG. 1A.

The multifunction peripheral 10 is an image forming apparatus including an image reading portion 1, an ADF 2, an image forming portion 3, a sheet feed cassette 4, a control portion 5, and an operation display portion 6 etc. The operation display portion 6 is a touch panel or the like configured to display various information in accordance with control instructions from the control portion 5, and accept user operations for inputting various operation signals with respect to the control portion 5. It should be noted that the ADF 2 and the control portion 5 form a sheet conveying device according to the present disclosure; and the image reading portion 1, the ADF 2, and the control portion 5 form an image reading apparatus according to the present disclosure. In addition, the present disclosure is applicable to an image reading apparatus or an image forming apparatus such as a scanner, a facsimile device, and a copy machine.

The control portion 5 is a computer including control devices such as a CPU, a ROM, a RAM, and an EEPROM. The CPU is a processor configured to execute various computation processes. The ROM is a nonvolatile storage portion in which information such as control programs configured to cause the CPU to execute various processes is stored in advance. The control portion 5 collectively controls the multifunction peripheral 10 by executing, by the CPU, various control programs stored in the ROM in advance. The RAM is a volatile storage portion, and the EEPROM is a nonvolatile storage portion. The RAM and the EEPROM are used as temporary storage memories (workspace) for various processes executed by the CPU. It should be noted that the control portion 5 may be formed with electronic circuits such as integrated circuits (ASIC, DSP), or may be a control portion provided separately from a main control portion configured to collectively control the multifunction peripheral 10.

In particular, an image reading program configured to cause the CPU of the control portion 5 to execute a later described reading control process (cf. FIG. 5) is stored in advance on the ROM of the control portion 5. It should be noted that the image reading program is stored in a computer-readable storage medium such as a CD, a DVD, or a flash memory; and may be installed from the storage medium to a storage portion such as a hard disk that is not shown or the EEPROM of the control portion 5. The present disclosure may be considered as a method for executing each process procedure in the reading control process in the multifunction peripheral 10, an image reading program configured to cause the control portion 5 to execute each of the process procedures of the reading control process, or a computer-readable storage medium on which the image reading program is stored.

The image reading portion 1 includes a document sheet table 11, a reading unit 12, mirrors 13 and 14, an optical lens 15, and a CCD (Charge Coupled Device) 16 etc.; and is an image reading portion configured to execute an image reading process of reading image data from a document sheet P. The document sheet P is a sheet such as a paper or a film.

The document sheet table 11 is disposed on the top surface of the image reading portion 1, and has a document sheet mounting surface 111 and a conveying-and-reading surface 112 as shown in FIG. 1B. The document sheet mounting surface 111 is a piece of translucent glass for placement and reading, and is where the document sheet P which is a reading target of image data is to be placed. The conveying-and-reading surface 112 is a piece of glass for conveying and reading and is configured to allow passing of light emitted from the reading unit 12 to the document sheet P conveyed by the ADF 2.

The reading unit 12 includes an LED light source 121 and a mirror 122, and is formed to be movable in a sub scanning direction 71 by a moving mechanism, which is not shown, using a drive portion such as a stepping motor. When the reading unit 12 is moved in the sub scanning direction 71 by the drive portion, light emitted from the LED light source 121 on the document sheet table 11 scans in the sub scanning direction 71.

The LED light source 121 includes multiple white LEDs arranged along a main scanning direction 72 (a depth direction in FIG. 1A). The LED light source 121 emits white light onto the document sheet P for an amount corresponding to a single line in the main scanning direction 72 through the conveying-and-reading surface 112 or the document sheet mounting surface 111 of the document sheet table 11. An irradiation position for the light from the LED light source 121 is a reading position 12A of image data for the image reading portion 1, and the reading position 12A moves in the sub scanning direction 71 in association with the movement of the reading unit 12 in the sub scanning direction 71. More specifically, when the image data is read from the document sheet P placed on the document sheet mounting surface 111, the reading unit 12 is moved to a position where the light from the LED light source 121 passes the document sheet mounting surface 111. When the image data is read from the document sheet P conveyed by the ADF 2, the reading unit 12 is moved to a position where the light from the LED light source 121 passes the conveying-and-reading surface 112.

Reflected light obtained when the light from the LED light source 121 is irradiated on the document sheet P located at the reading position 12A is reflected by the mirror 122 toward the mirror 13. The light reflected by the mirror 122 is guided to the optical lens 15 by the mirror 13 and the mirror 14. The optical lens 15 causes incoming light to be condensed and irradiated on the CCD 16.

The CCD 16 is a photoelectric conversion element configured to convert receive light into an electrical signal (voltage) corresponding to the amount of the light. The CCD 16 inputs, to the control portion 5 as the image data of the document sheet P, the electrical signal based on the reflected light entering thereto obtained when the light irradiated on the document sheet P from the LED light source 121 is reflected. In the manner described above, the image data is read from the document sheet P at the image reading portion 1 based on reflected light obtained when light that has passed through the document sheet mounting surface 111 is irradiated on the document sheet P placed on the document sheet mounting surface 111, or reflected light obtained when light that has passed through the conveying-and-reading surface 112 is irradiated on the document sheet P conveyed by the ADF 2.

As shown in FIG. 1A, the ADF 2 is an automatic document sheet conveying device that includes a housing 20, a sheet placement portion 21, a sheet feed roller 22, a plurality of conveying rollers 23, a document sheet holder 24, a sheet discharge portion 25, a cover member 26, and guide members 27 etc.

The cover member 26 is a cover member configured to cover the sheet feed roller 22 and the conveying rollers 23 etc., and can be opened or closed using, as a center, a rotation shaft 26A of the housing 20 as shown in FIG. 1A. When the cover member 26 is open, the sheet feed roller 22 and the conveying rollers 23 etc., become exposed, and it is possible to, for example, deal with paper jamming at the ADF 2.

The sheet placement portion 21 is a tray on which a single piece or a plurality of pieces of the document sheet P is placed. The sheet placement portion 21 has an inclination where the downstream side of a conveying direction R1 of the document sheet P faces downward. The user, when placing the document sheet P on the sheet placement portion 21, places the document sheet P at a position determined in advance where the document sheet P and the sheet feed roller 22 make contact.

At the ADF 2, the document sheet P that has been placed on the sheet placement portion 21 passes through the reading position 12A and is conveyed to the sheet discharge portion 25 by the sheet feed roller 22 and the conveying rollers 23 driven by a motor that is not shown. The sheet feed roller 22 and the conveying rollers 23 etc., are examples of a conveyance member. As a result, it is possible to read the image data from the document sheet P at the image reading portion 1, since the light that has passed through the conveying-and-reading surface 112 from the reading unit 12 is irradiated on the document sheet P conveyed by the ADF 2.

The document sheet holder 24 is disposed above the conveying-and-reading surface 112, with an interval provided therebetween so as to allow the document sheet P to pass through. The document sheet holder 24 is formed so as to be long in the main scanning direction 72, and a white sheet is attached to the bottom surface (surface on the side of the document sheet table 11) thereof. In the multifunction peripheral 10, image data of the white sheet is read as white-color reference data. The white-color reference data is used for shading correction and the like which are commonly known. Details of the ADF 2 will be described later.

The image forming portion 3 is an electronic photograph type image forming portion that executes an image formation process (printing process) based on image data read by the image reading portion 1 or image data inputted from an information processing device such as an external personal computer.

More specifically, the image forming portion 3 includes a photoconductor drum 31, a charging device 32, an exposure device (LSU) 33, a developing device 34, a transfer roller 35, a charge neutralization device 36, a fixing roller 37, a pressure roller 38, and a sheet discharge tray 39 etc. In the image forming portion 3, an image is formed through the following steps on a paper sheet supplied from the sheet feed cassette 4, and the paper sheet is discharged in the sheet discharge tray 39.

First, the photoconductor drum 31 is uniformly charged to a predetermined electric potential by the charging device 32. Next, light is irradiated on the surface of the photoconductor drum 31 by the exposure device 33 based on image data. With this, an electrostatic latent image corresponding to the image data is formed on the surface of the photoconductor drum 31. Then, the electrostatic latent image on the photoconductor drum 31 is developed (visualized) as a toner image by the developing device 34. On the developing device 34, a toner (developer) is supplied from a toner container 34A that is detachable/reattachable with respect to the image forming portion 3. Next, the toner image formed on the photoconductor drum 31 is transferred onto a paper sheet by the transfer roller 35. Then, the toner image transferred onto the paper sheet is heated by the fixing roller 37 to be melted and fixed when the paper sheet passes between the fixing roller 37 and the pressure roller 38. It should be noted that the electric potential of the photoconductor drum 31 is neutralized by the charge neutralization device 36.

<Configuration of Relevant Parts of the ADF 2>

Figure 2A:
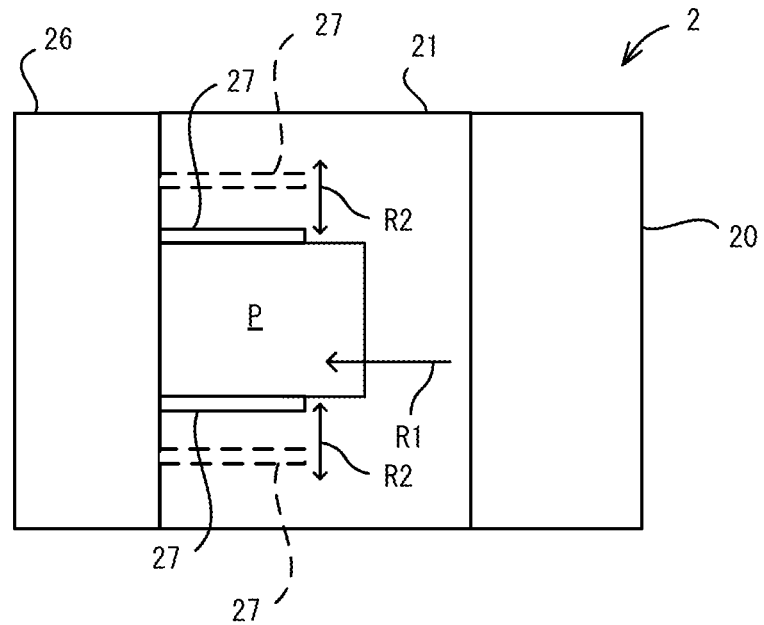
FIG. 2A is a planar schematic diagram of an ADF included in the multifunction peripheral shown in FIG. 1A.

Next, the configuration of relevant parts of the ADF 2 will be described with reference to FIGS. 2 and 3. FIG. 2A shows a state in which the cover member 26 is closed, and FIG. 2B shows a state in which the cover member 26 is open.

As shown in FIG. 2A, the guide members 27 are each movable in a width direction R2 of the document sheet P perpendicular to the conveying direction R1 of the document sheet P, and guide the document sheet P conveyed by the sheet feed roller 22 etc. The guide members 27 slide in the width direction R2 in a linked manner. With this, when one of the guide members 27 slides, the other guide member 27 slides in a linked manner. A user moves, in the width direction R2 of the document sheet P, one of the guide members 27 in accordance with the size of the document sheet P that is to be placed on the sheet placement portion 21, and places the document sheet P in the area surrounded by the guide members 27. For example, as a linkage mechanism for each of the guide members 27, a commonly known linkage sliding mechanism formed from a pinion disposed on the sheet placement portion 21 and a rack disposed on each of the guide members 27 is used. It should be noted that, instead of having one pair of the guide members 27, a configuration including a guide member fixed on the sheet placement portion 21, and a guide member that can be moved close to or away from the guide member is also conceivable.

Figure 2B:
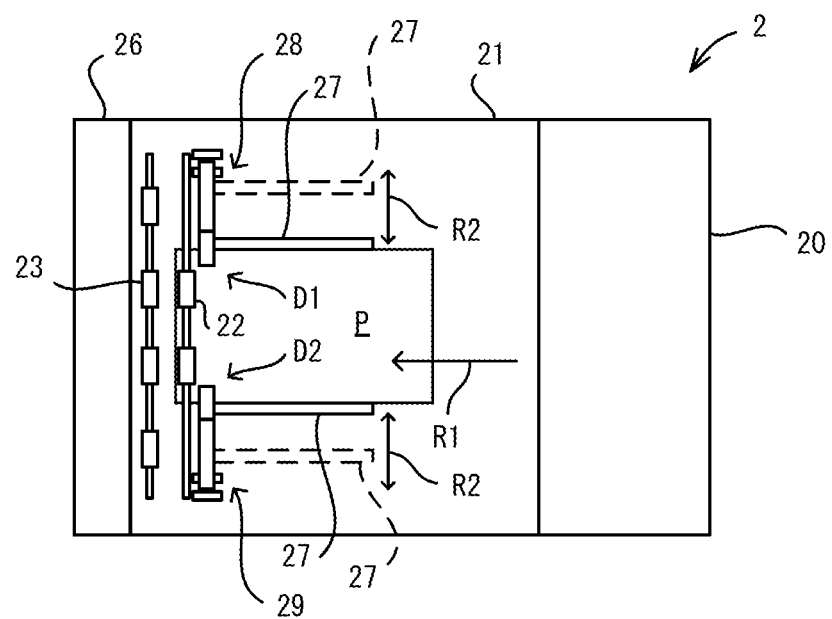
FIG. 2B is a planar schematic diagram of the ADF included in the multifunction peripheral shown in FIG. 1A.
Figure 3:
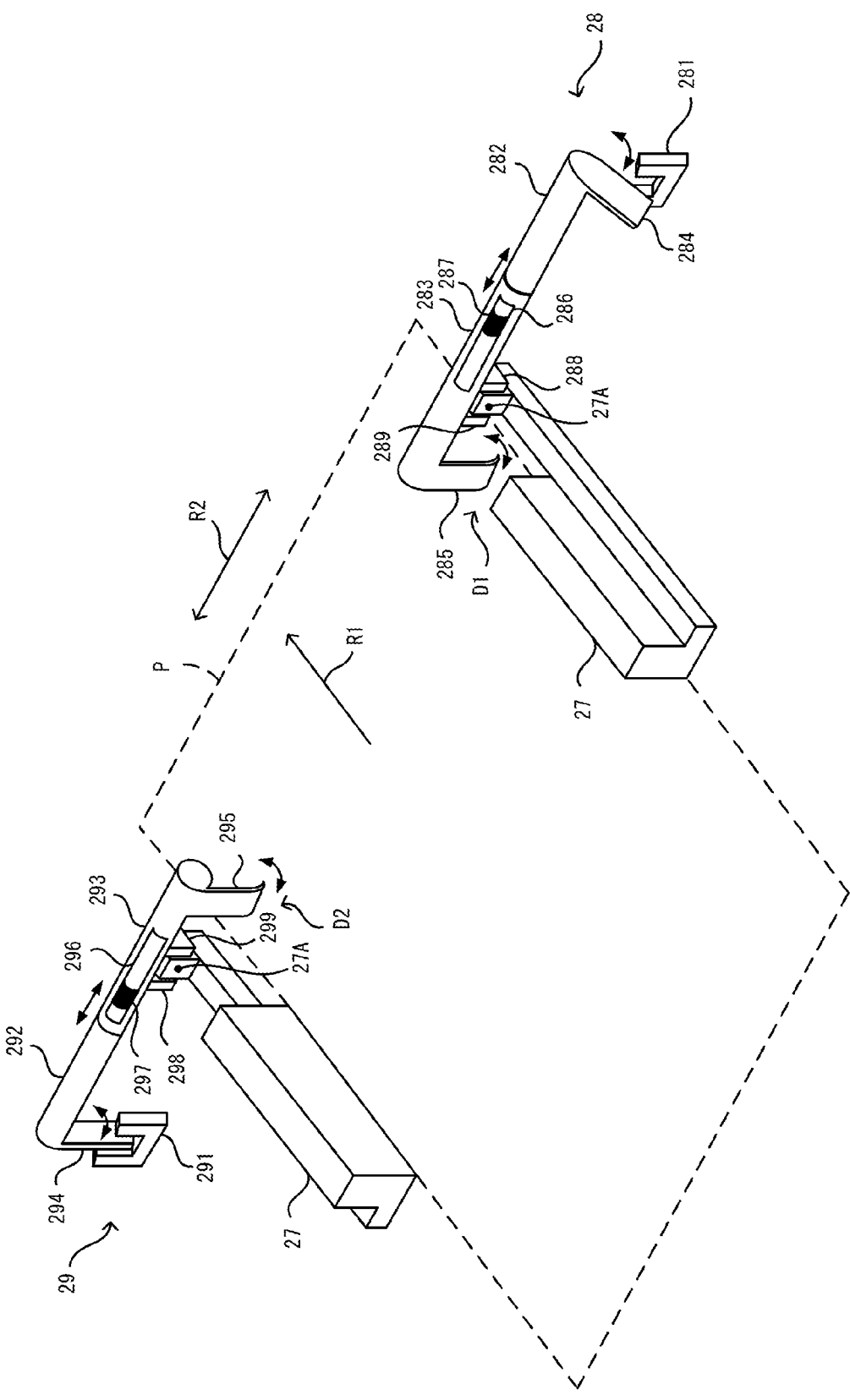
FIG. 3 is a schematic diagram showing one example of a first sensing portion and a second sensing portion included in the multifunction peripheral shown in FIG. 1A.

As shown in FIG. 2B, the ADF 2 includes a first sensing portion 28 and a second sensing portion 29 configured to respectively sense the presence or absence of the document sheet P at a first sensing position D1 and a second sensing position D2, which are determined in advance and spaced in the width direction R2 at the sheet placement portion 21. However, as described later, the first sensing portion 28 and the second sensing portion 29 are opposite to each other regarding a sense signal corresponding to sensing or not sensing the document sheet P. It should be noted that the first sensing position D1 and the second sensing position D2 are positions determined in advance for sensing whether or not a tip in the conveying direction R1 of the document sheet P placed on the sheet placement portion 21 has reached a position where contact with the sheet feed roller 22 is to be made. Furthermore, the first sensing position D1 and the second sensing position D2 are located on a line parallel to the width direction R2, and are in a parallel positional relationship in the conveying direction R1. It should be noted that the positions of the first sensing position D1 and the second sensing position D2 in the conveying direction R1 can be changed as appropriate, and may be, for example, between the sheet feed roller 22 and the conveying rollers 23.

Conventionally, two sensors configured to sense a tilt of a document sheet have not been used for other use applications. Therefore, it has been necessary to have, for example, a sensor besides the sensors configured to sense an open state of the cover member 26 disposed on the ADF 2. In contrast, the multifunction peripheral 10 can sense the open state of the cover member 26 and a tilt of a sheet using two sensors.

Specific Examples of the First Sensing Portion 28 and the Second Sensing Portion 29

Here, specific examples of the first sensing portion 28 and the second sensing portion 29 will be described with reference to FIG. 3.

The first sensing portion 28 includes an optical sensor 281, a rotational portion 282, and a rotational portion 283 etc. The optical sensor 281 is one example of a first optical sensor, and the rotational portion 282 and the rotational portion 283 are examples of a first drive portion. The optical sensor 281 is disposed on the sheet placement portion 21. The rotational portion 282 and the rotational portion 283 are disposed on the cover member 26.

The optical sensor 281 has a light-emitting portion and a light-receiving portion, and outputs a sense signal in accordance with whether or not light emitted from the light-emitting portion has been received by the light-receiving portion. More specifically, the optical sensor 281 outputs an ON-signal (one example of a first sense signal) when the light from the light-emitting portion has been received by the light-receiving portion, and outputs an OFF-signal (one example of a second sense signal) when light from the light-emitting portion is blocked and has not been received by the light-receiving portion. The sense signal outputted from the optical sensor 281 is inputted to the control portion 5. The ON-signal and the OFF-signal outputted from the optical sensor 281 are, for example, transmitted to the control portion 5 depending on whether or not an output voltage from the optical sensor 281 is equal to or lower than a threshold set in advance.

The rotational portion 282 has a light-blocking portion 284 disposed on one end thereof, and has the other end fitted in the rotational portion 283. The rotational portion 282 is rotatably supported by a rotation support portion located outside the figure and disposed on the cover member 26. The light-blocking portion 284 switches whether or not to block light to the optical sensor 281 depending on a rotation position of the rotational portion 282. It should be noted that the movement of the rotational portion 282 in the width direction R2 is restricted by the rotation support portion of the cover member 26. In addition, a later described stopper 287 is disposed on the rotational portion 282 at a position where the rotational portion 282 is fitted in the rotational portion 283.

The rotational portion 283 includes a contact portion 285, an opening portion 286, a rib 288, and a rib 289. The contact portion 285 is disposed at one end of the rotational portion 283, and makes contact with the document sheet P at the first sensing position D1 on the sheet placement portion 21 to rotate the rotational portion 283. More specifically, when the document sheet P is inserted from the sheet placement portion 21 toward the sheet feed roller 22, the contact portion 285 makes contact with the document sheet P and is moved in the conveying direction R1 of the document sheet P to rotate the rotational portion 283 in the conveying direction R1.

The opening portion 286 is long in the width direction R2 of the document sheet P, and the stopper 287 disposed on the rotational portion 282 abuts an opening edge of the opening portion 286. The stopper 287 can be moved in the width direction R2 within the opening portion 286. With this, the rotational portion 283 is slidable in the width direction R2 with respect to the rotational portion 282, and rotation of the rotational portion 282 and the rotational portion 283 are performed integrally.

In the first sensing portion 28, the centers of gravity of the rotational portion 282 and the rotational portion 283 are determined such that the light-blocking portion 284 is positioned so as to not block light to the optical sensor 281 when the contact portion 285 is not in contact with the document sheet P. Furthermore, in the first sensing portion 28, when the contact portion 285 is in contact with the document sheet P, the rotational portion 282 and the rotational portion 283 rotate to move the light-blocking portion 284 to cause light to the optical sensor 281 to be blocked by the light-blocking portion 284. It is also conceivable for the rotational portion 282 or the rotational portion 283 to have an elastic member such as a coil spring configured to restore the light-blocking portion 284 to its initial position when the contact portion 285 shifts from a state of being in contact with the document sheet P on the sheet placement portion 21 to a state of not being in contact therewith.

In a gap between the rib 288 and the rib 289, a connection portion 27A disposed on the guide members 27 is fitted via a predetermined gap. With this, when the guide members 27 are moved by the user in the width direction R2 in accordance with the size of the document sheet P, the rib 288 or the rib 289 is pressed by the connection portion 27A to move the rotational portion 283 in the width direction R2. Thus, the connection portion 27A moves, in the width direction R2, the contact portion 285 (the first sensing position D1) of the rotational portion 283 in contact with the document sheet P on the sheet placement portion 21 in a manner linked to the guide members 27. With this, the first sensing portion 28 can determine the presence or absence of the document sheet P even when the size of the document sheet P conveyed by the ADF 2 is changed.

It should be noted that the linkage of the connection portion 27A, and the rib 288 and the rib 289 is released when the cover member 26 is open, and is formed again when the cover member 26 is closed. Thus, locking mechanisms that are not shown are provided for restricting movement of both the guide members 27 and the rotational portion 283 when the cover member 26 is open. With this, since the guide members 27 cannot be moved when the cover member 26 is in the open state, the connection portion 27A, and the rib 288 and the rib 289 can be connected when the cover member 26 is closed.

In the first sensing portion 28, the presence or absence of blocking of light to the optical sensor 281 is switched by the light-blocking portion 284 that is moved in accordance with whether or not the contact portion 285 is in contact with the document sheet P, and the ON-signal or the OFF-signal is outputted from the optical sensor 281.

Similarly, the second sensing portion 29 includes an optical sensor 291, a rotational portion 292, and a rotational portion 293 etc. The optical sensor 291 is one example of a second optical sensor, and the rotational portion 292 and the rotational portion 293 are examples of a second drive portion. The optical sensor 291 is disposed on the sheet placement portion 21. The rotational portion 292 and the rotational portion 293 are disposed on the cover member 26.

The optical sensor 291 has a light-emitting portion and a light-receiving portion, and outputs a sense signal after sensing whether or not light emitted from the light-emitting portion has been received by the light-receiving portion. More specifically, the optical sensor 291 outputs an ON-signal (one example of the first sense signal) when the light from the light-emitting portion has been received by the light-receiving portion, and outputs an OFF-signal (one example of the second sense signal) when light from the light-emitting portion is blocked and has not been received by the light-receiving portion. The sense signal outputted from the optical sensor 291 is inputted to the control portion 5. The ON-signal and the OFF-signal outputted from the optical sensor 291 are, for example, transmitted to the control portion 5 depending on whether or not an output voltage from the optical sensor 291 is equal to or lower than a threshold set in advance.

The rotational portion 292 has a light-blocking portion 294 disposed on one end thereof, and has the other end fitted in the rotational portion 293. The rotational portion 292 is rotatably supported by a rotation support portion located outside the figure and disposed on the cover member 26. The light-blocking portion 294 switches whether or not to block light to the optical sensor 291 depending on a rotation position of the rotational portion 292. It should be noted that the movement of the rotational portion 292 in the width direction R2 is restricted by the rotation support portion of the cover member 26. In addition, a later described stopper 297 is disposed on the rotational portion 292 at a position where the rotational portion 292 is fitted in the rotational portion 293.

The rotational portion 293 includes a contact portion 295, an opening portion 296, a rib 298, and a rib 299. The contact portion 295 is disposed at one end of the rotational portion 293, and makes contact with the document sheet P at the second sensing position D2 on the sheet placement portion 21 to rotate the rotational portion 293. More specifically, when the document sheet P is inserted from the sheet placement portion 21 toward the sheet feed roller 22, the contact portion 295 makes contact with the document sheet P and is moved in the conveying direction R1 of the document sheet P to rotate the rotational portion 293 in the conveying direction R1.

The opening portion 296 is long in the width direction R2 of the document sheet P, and the stopper 297 disposed on the rotational portion 292 abuts an opening edge of the opening portion 296. The stopper 297 can be moved in the width direction R2 within the opening portion 296. With this, the rotational portion 293 is slidable in the width direction R2 with respect to the rotational portion 292, and rotation of the rotational portion 292 and the rotational portion 293 are performed integrally.

In the second sensing portion 29, the centers of gravity of the rotational portion 292 and the rotational portion 293 are determined such that the light-blocking portion 294 is positioned so as to block light to the optical sensor 291 when the contact portion 295 is not in contact with the document sheet P. Furthermore, in the second sensing portion 29, when the contact portion 295 is in contact with the document sheet P, the rotational portion 292 and the rotational portion 293 rotate to move the light-blocking portion 294 to cause blocking of light to the optical sensor 291 by the light-blocking portion 294 to be removed. Regarding this point, the second sensing portion 29 has a configuration different from the first sensing portion 28.

More specifically, in the first sensing portion 28, the ON-signal is outputted when the document sheet P is absent at the first sensing position D1, and the OFF-signal is outputted when the document sheet P is present at the first sensing position D1. On the other hand, in the second sensing portion 29, the OFF-signal is outputted when the document sheet P is absent at the second sensing position D2, and the ON-signal is outputted when the document sheet P is present at the second sensing position D2. It is also conceivable for the rotational portion 292 or the rotational portion 293 to have an elastic member such as a coil spring configured to restore the light-blocking portion 294 to its initial position when the contact portion 295 shifts from a state of being in contact with the document sheet P on the sheet placement portion 21 to a state of not being in contact therewith.

In a gap between the rib 298 and the rib 299, a connection portion 27A disposed on the guide members 27 is fitted via a predetermined gap. With this, when the guide members 27 are moved by the user in the width direction R2 in accordance with the size of the document sheet P, the rib 298 or the rib 299 is pressed by the connection portion 27A to move the rotational portion 293 in the width direction R2. Thus, the connection portion 27A moves, in the width direction R2, the contact portion 295 (the second sensing position D2) of the rotational portion 293 in contact with the document sheet P on the sheet placement portion 21 in a manner linked to the guide members 27. With this, the second sensing portion 29 can determine the presence or absence of the document sheet P even when the size of the document sheet P conveyed by the ADF 2 is changed.

It should be noted that the linkage of the connection portion 27A, and the rib 298 and the rib 299 is released when the cover member 26 is open, and is formed again when the cover member 26 is closed. Thus, locking mechanisms that are not shown are provided for restricting movement of both the guide members 27 and the rotational portion 293 when the cover member 26 is open. With this, since the guide members 27 cannot be moved when the cover member 26 is in the open state, the connection portion 27A, and the rib 298 and the rib 299 can be connected when the cover member 26 is closed.

In the second sensing portion 29, the presence or absence of blocking of light to the optical sensor 291 is switched by the light-blocking portion 294 that is moved in accordance with whether or not the contact portion 295 is in contact with the document sheet P, and the ON-signal or the OFF-signal is outputted from the optical sensor 291.

With the multifunction peripheral 10 formed as described above, the pattern of a combination of sense signals outputted by the first sensing portion 28 and the second sensing portion 29 as shown in FIG. 4 changes depending on the open state of the cover member 26 and the presence or absence of the placed document sheet P. In the control portion 5, information is stored in the ROM or the EEPROM indicating a correspondence relationship between various states and the combination of the sense signals as shown in FIG. 4.

More specifically, as shown in FIG. 4, in the first sensing portion 28, the ON-signal is outputted from the optical sensor 281 when the document sheet P is absent at the first sensing position D1 of the sheet placement portion 21. In addition, in the first sensing portion 28, the OFF-signal is outputted from the optical sensor 281 when the document sheet P is present at the first sensing position D1 of the sheet placement portion 21. Furthermore, in the first sensing portion 28, the ON-signal is outputted from the optical sensor 281 when the cover member 26 is open since the optical sensor 281 and the light-blocking portion 284 become separated. Thus, the first sensing portion 28 outputs two types of sense signals which are the ON-signal and the OFF-signal depending on the presence or absence of the document sheet P at the first sensing position D1, and outputs the ON-signal in response to the open state of the cover member 26.

On the other hand, as shown in FIG. 4, in the second sensing portion 29, the OFF-signal is outputted from the optical sensor 291 when the document sheet P is absent at the second sensing position D2 of the sheet placement portion 21. In addition, in the second sensing portion 29, the ON-signal is outputted from the optical sensor 291 when the document sheet P is present at the second sensing position D2 of the sheet placement portion 21. Furthermore, in the second sensing portion 29, the ON-signal is outputted from the optical sensor 291 when the cover member 26 is open since the optical sensor 291 and the light-blocking portion 294 become separated. Thus, the second sensing portion 29 outputs two types of sense signals which are the ON-signal and the OFF-signal depending on the presence or absence of the document sheet P at the second sensing position D2, and outputs the ON-signal in response to the open state of the cover member 26. The second sensing portion 29 is opposite of the first sensing portion 28 regarding the sense signals outputted in accordance with the presence or absence of the document sheet P, but is identical to the first sensing portion 28 regarding the sense signal outputted in response to the open state of the cover member 26.

With the multifunction peripheral 10, various states are sensed based on a combination of the sense signals outputted from the first sensing portion 28 and the second sensing portion 29 of the ADF 2 when a later described reading control process is executed by the control portion 5. In particular, the control portion 5 senses, through the reading control process, the open state of the cover member 26, a tilt of the document sheet P, and the presence or absence of the document sheet P being placed on the sheet placement portion 21, based on a combination of the sense signals outputted from the first sensing portion 28 and the second sensing portion 29. The control portion 5, when executing the reading control process, corresponds to a sensing control portion.

<Reading Control Process>

Figure 5:
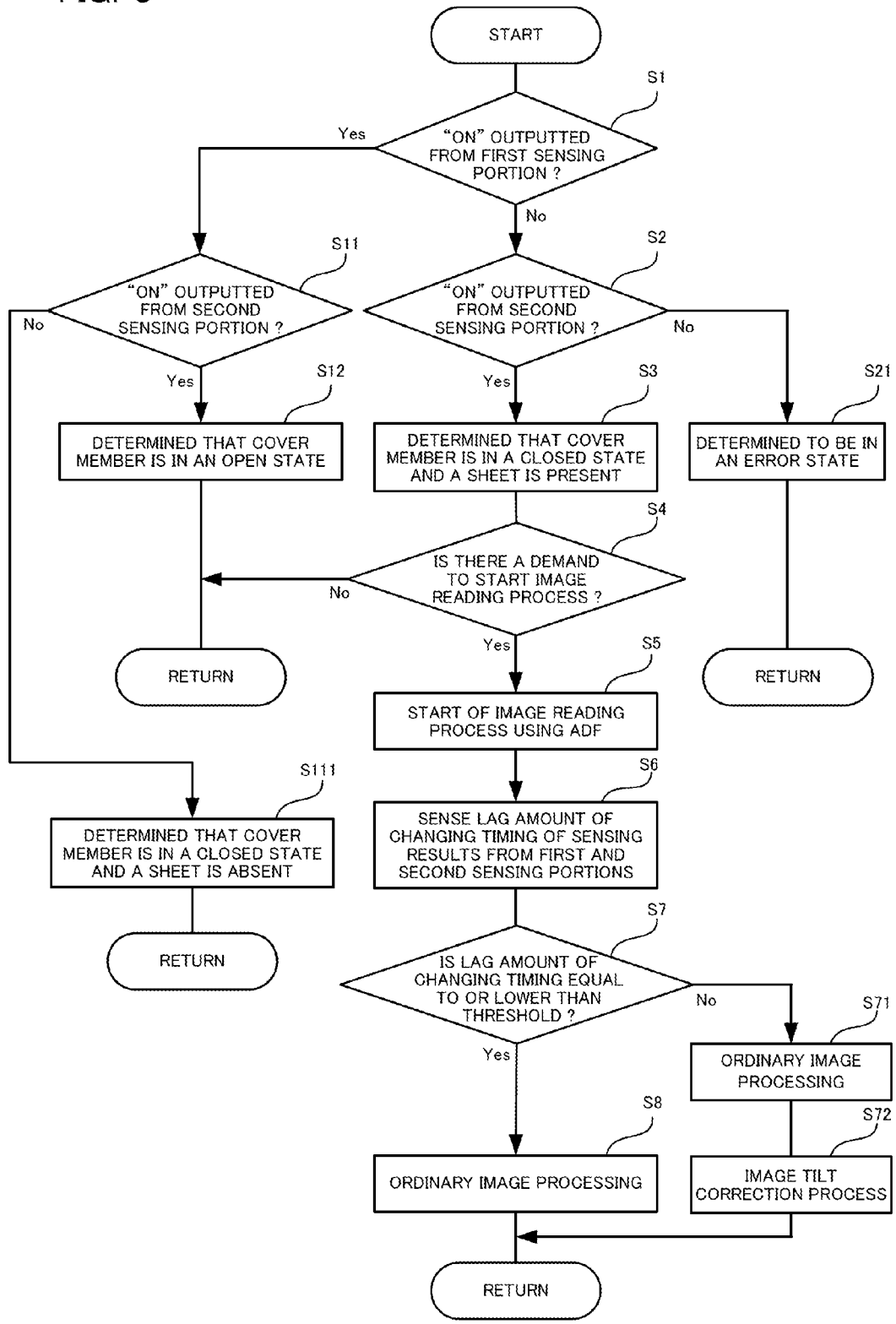
FIG. 5 is a flowchart showing one example of steps of a reading control process executed by the multifunction peripheral shown in FIG. 1A.

In the following, one example of procedures of the reading control process executed by the control portion 5 will be described with reference to FIG. 5. Here, steps S1, S2, etc., represent identification numbers of the process procedures (steps) executed by the control portion 5.

[Step S1]

At step S1, the control portion 5 determines whether or not the ON-signal is outputted from the first sensing portion 28. If the control portion 5 determines that the ON-signal is outputted from the first sensing portion 28 ("Yes" side at S1), the control portion 5 shifts the process to step S11. On the other hand, if the control portion 5 determines that the OFF-signal is outputted from the first sensing portion 28 ("No" side at S1), the control portion 5 shifts the process to step S2.

[Step S2]

At step S2, the control portion 5 determines whether or not the ON-signal is outputted from the second sensing portion 29. If the control portion 5 determines that the ON-signal is outputted from the second sensing portion 29 ("Yes" side at S2), the control portion 5 shifts the process to step S3. On the other hand, if the control portion 5 determines that the OFF-signal is outputted from the second sensing portion 29 ("No" side at S2), the control portion 5 shifts the process to step S21.

[Step S21]

At step S21, the control portion 5 determines that the process has entered an error state, and returns the process to step S1. In this case, the image reading process using the ADF 2 is restricted since the process by the control portion 5 does not shift to step S4. With this, the image reading process using the ADF 2 is restricted when, for example, the document sheet P is placed on the sheet placement portion 21 in a tilted state, and the existence of the document sheet P is sensed only by the first sensing portion 28 and the existence of the document sheet P is not sensed by the second sensing portion 29. At step S21, the control portion 5 may display an error on the operation display portion 6. In such case, a notification of, for example, "Please correctly set the document sheet" is displayed on the operation display portion 6.

[Step S3]

At step S3, the control portion 5 determines that the cover member 26 is in a closed state, and the document sheet P is properly placed on the sheet placement portion 21. Thus, in the present embodiment, the control portion 5 determines that the cover member 26 is in the closed state and the document sheet P is properly placed on the sheet placement portion 21 when the OFF-signal is outputted from the first sensing portion 28 and the ON-signal is outputted from the second sensing portion 29.

[Step S4]

At step S4, the control portion 5 determines whether or not there has been a demand to start the image reading process. More specifically, the control portion 5 determines that there has been a demand to start the image reading process, when the control portion 5 accepts an operation of a start key of the operation display portion 6 or receives a signal requesting the start of the image reading process from an external information processing device. If the control portion 5 determines that there has been a demand to start the image reading process ("Yes" side at S4), the control portion 5 shifts the process to step S5. On the other hand, if there is no demand to start the image reading process ("No" side at S4), the control portion 5 returns the process to step S1.

It should be noted that the start of the image reading process may conceivably be demanded in a state where the cover member 26 is in a closed state and the document sheet P is not determined to be set properly in the sheet placement portion 21 as in the case with step S3. In this case, since image data cannot be read from the document sheet P conveyed by the ADF 2, the control portion 5 may conceivably execute, for example, an image reading process of reading image data from the document sheet P placed on the document sheet mounting surface 111.

[Step S5]

At step S5, the control portion 5 controls the image reading portion 1 and the ADF 2 to cause the image reading portion 1 to execute the image reading process of reading the image data from the document sheet P conveyed by the ADF 2.

[Step S6]

At step S6, when conveying the sheet by the ADF 2 is started, the control portion 5 senses a lag amount dt of changing timings of sensing results from the first sensing portion 28 and the second sensing portion 29. More specifically, an interval from the change of a sensing result of either one of the first sensing portion 28 or the second sensing portion 29 to the change of a sensing result of the other is sensed as the lag amount dt.

Figure 6:
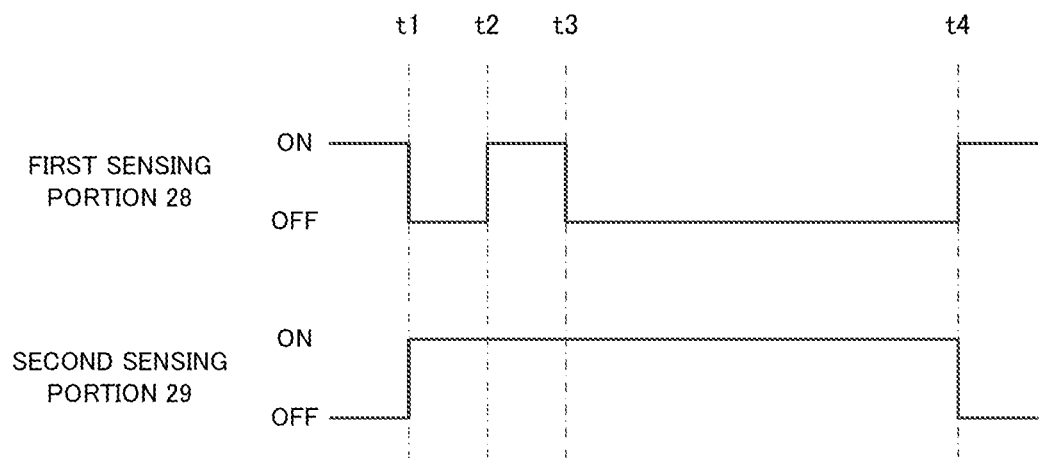
FIG. 6 shows an alternate example of the sense signals from the first sensing portion and the second sensing portion included in the multifunction peripheral shown in FIG. 1A.
Figure 7:
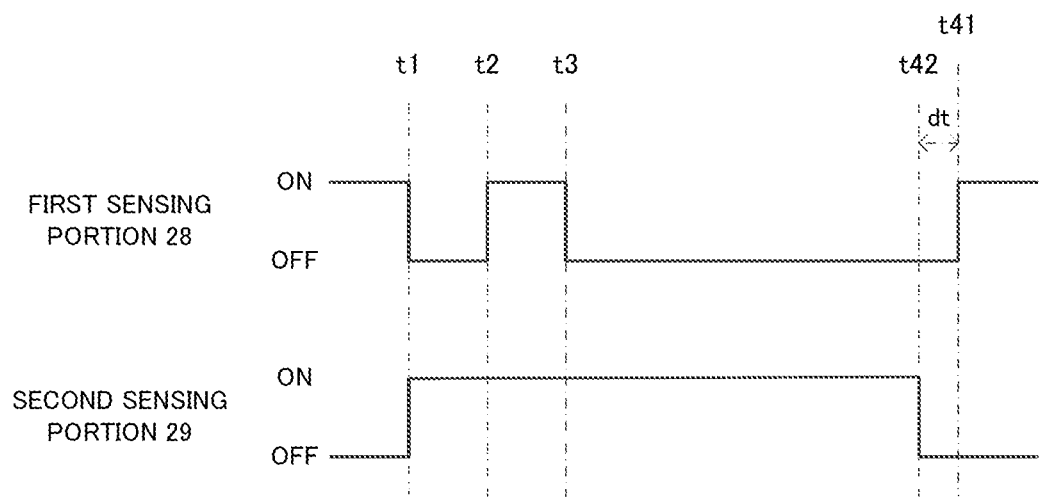
FIG. 7 shows an alternate example of the sense signals from the first sensing portion and the second sensing portion included in the multifunction peripheral shown in FIG. 1A.

FIGS. 6 and 7 are for describing examples of the changing timing of sensing results from the first sensing portion 28 and the second sensing portion 29. FIG. 6 shows sensing results of a case where the document sheet P is conveyed properly, and FIG. 7 shows sensing results of a case where the document sheet P is conveyed in a tilted state.

As shown in FIG. 6, until the document sheet P is properly placed on the sheet placement portion 21 (before time point t1), the ON-signal is outputted from the first sensing portion 28 and the OFF-signal is outputted from the second sensing portion 29. It should be noted that since the OFF-signal is outputted from the second sensing portion 29, the cover member 26 is in a closed state.

Then, the sense signal from the first sensing portion 28 changes from the ON-signal to the OFF-signal and the sense signal from the second sensing portion 29 changes from the OFF-signal to the ON-signal when the document sheet P is properly placed on the sheet placement portion 21 (time point t1).

When the document sheet P is properly conveyed by the ADF 2 after the image reading process has started and the back end of the document sheet P passes through the contact portion 285 and the contact portion 295 (time point t4), the sense signals from the first sensing portion 28 and the second sensing portion 29 change at the same timing. More specifically, the sense signal from the first sensing portion 28 changes from the OFF-signal to the ON-signal, and the sense signal from the second sensing portion 29 changes from the ON-signal to the OFF-signal.

As previously described, before conveying of the document sheet P by the ADF 2 is started, when the cover member 26 is open, ON-signals are outputted from both the first sensing portion 28 and the second sensing portion 29, and the open state of the cover member 26 is sensed (S12). On the other hand, after conveying of the document sheet P by the ADF 2 has started, the sense signal from the second sensing portion 29 may conceivably change to the ON-signal before the sense signal from the first sensing portion 28 changes to the OFF-signal because of tilting of the document sheet P. Then, after conveying of the document sheet P by the ADF 2 has started, the control portion 5 may conceivably sense the open state of the cover member 26 when a sense signal from either one of the first sensing portion 28 or the second sensing portion 29 did not change within a predetermined time interval set in advance after the ON-signals are outputted from both the first sensing portion 28 and the second sensing portion 29. With this, the control portion 5 can distinctively sense the open state of the cover member 26 from a state in which tilting of the document sheet P has occurred.

When the document sheet P is conveyed in the tilted state, the timings at which the back end of the document sheet P passes through the contact portion 285 and the contact portion 295 become different. Thus, as shown in FIG. 7, a time difference by the lag amount dt occurs between the timing (time point t41) where the sense signal of the first sensing portion 28 changes from the OFF-signal to the ON-signal and the timing (time point t42) where the sense signal from the second sensing portion 29 changes from the ON-signal to the OFF-signal. For example, in the example shown in FIG. 7, the changing timing of the sense signal from the first sensing portion 28 is delayed by the lag amount dt with respect to the changing timing of the sense signal from the second sensing portion 29. Thus, it is possible to determine that the first sensing position D1 side of the back end of the document sheet P is conveyed in a manner delayed from the second sensing position D2 side.

[Step S7]

At step S7, the control portion 5 determines whether or not the lag amount dt sensed at step S6 is equal to or smaller than a threshold set in advance. The threshold is an index value set in advance for determining whether or not the tilt of the document sheet P is equal to or smaller than an acceptable level set in advance.

If the control portion 5 determines that the lag amount dt is equal to or smaller than the threshold ("Yes" side at S7), the control portion 5 shifts to the process to step S8. On the other hand, if the lag amount dt is larger than the threshold ("No" side at S7), the control portion 5 shifts the process to step S71.

[Step S8]

If the lag amount dt is equal to or smaller than the threshold, the tilt of the document sheet P is equal to or smaller than the acceptable level. Thus, at step S8, the control portion 5 execute an ordinary image processing with respect to the image data read by the image reading portion 1, and ends the series of the reading control process. The ordinary image processing is, for example, shading correction, gamma correction, and the like.

[Step S71]

On the other hand, if the lag amount dt is larger than the threshold, at step S71, although the control portion 5 executes the ordinary image processing with respect to the image data read by the image reading portion similarly to step S8, the control portion 5 then shifts the process to step S72.

[Step S72]

When the lag amount dt is larger than the threshold, a tilt that is larger than the acceptable level has occurred to the document sheet P. Thus, at step S72, the control portion 5 executes a tilt correction process with respect to the image data read by the image reading process based on the lag amount dt. The control portion 5, when executing the tilt correction process at step S72, corresponds to a rotation correction portion. With this, in the multifunction peripheral 10, even if a tilt has occurred in the document sheet P when the document sheet P set on the ADF 2 is conveyed, the tilt of the image in the image data read by the image reading portion 1 is corrected.

More specifically, the control portion 5 may conceivably sense the tilt of the document sheet P based on the lag amount dt sensed at step S6 and a conveying velocity of the document sheet P by the ADF 2, and correct the tilt in the image data in accordance with the tilt. In this case, the conveying velocity may be conceivably calculated based on a pre-set rotational velocity of the sheet feed roller 22 and the conveying rollers 23, and stored in advance in a storage portion such as the ROM or the EEPROM of the control portion 5. It should be noted that in a configuration where the control portion 5 changes the conveying velocity depending on the type or size of the document sheet P conveyed by the ADF 2, the control portion 5 may conceivably change the conveying velocity used at step S72 each time.

Furthermore, in the multifunction peripheral 10, a distance interval between the contact portion 285 and the contact portion 295 in the width direction R2, i.e., a distance interval between the first sensing position D1 and the second sensing position D2, is known from the positions of the guide members 27. On the other hand, the control portion 5 can calculate a distance interval of back end positions in the conveying direction R1 corresponding to the first sensing position D1 and the second sensing position D2 in the document sheet P, based on the conveying velocity of the document sheet P and the lag amount dt. With this, the control portion 5 can calculate the tilt of the document sheet P through sensing of the positions of the guide members 27 by sensors that are not shown. It should be noted that the sensing technique of the tilt of the document sheet P is not limited to those described above, and various conventional techniques for sensing a tilt of a sheet based on a lag amount of the changing timings of sense signals from two sensors may be used.

[Step S11]

When the control portion 5 determines that the ON-signal is outputted from the first sensing portion 28 at step S1, the control portion 5 determines, at the following step S11, whether or not the ON-signal is outputted from the second sensing portion 29 similarly to step S2. If the control portion 5 determines that the ON-signal is outputted from the second sensing portion 29 ("Yes" side at S11), the control portion 5 shifts the process to step S12. On the other hand, if the control portion 5 determines that the OFF-signal is outputted from the second sensing portion 29 ("No" side at S11), the control portion 5 shifts the process to step S111.

[Step S12]

At step S12, the control portion 5 determines that the cover member 26 is in the open state, and returns the process to step S1. In this case, the image reading process using the ADF 2 is restricted since the process by the control portion 5 does not shift to step S4. At step S12, the control portion 5 may display, on the operation display portion 6, that the cover member 26 is in the open state. In such a case, a notification of, for example, "The top cover is open" is displayed on the operation display portion 6.

A conceivable case is one in which the document sheet P is placed on the sheet placement portion 21 in a tilted state, and the existence of the document sheet P is sensed only by the second sensing portion 29 and the existence of the document sheet P is not sensed by the first sensing portion 28. Also in this case, the ON-signal is outputted from both the first sensing portion 28 and the second sensing portion 29. However, since the document sheet P is not properly placed on the sheet placement portion 21, the case is treated similarly to the case where the cover member 26 is in the open state, and there is no problem regarding restricting the image reading process using the ADF 2.

[Step S111]

At step S111, the control portion 5 determines that the cover member 26 is in the closed state and the document sheet P is not placed on the sheet placement portion 21, and returns the process to step S1. Also in this case, the image reading process using the ADF 2 is restricted since the process by the control portion 5 does not shift to step S4.

As described above, the multifunction peripheral 10 can sense the open state of the cover member 26 and the tilt of the document sheet P by the ADF 2, using the first sensing portion 28 and the second sensing portion 29. Thus, the sensor for sensing the open state of the cover member 26 and the sensor for sensing the tilt of the document sheet P can be combined, and the cost for manufacturing and the number of parts of the multifunction peripheral 10 are reduced.

Other Embodiments

Figure 8:
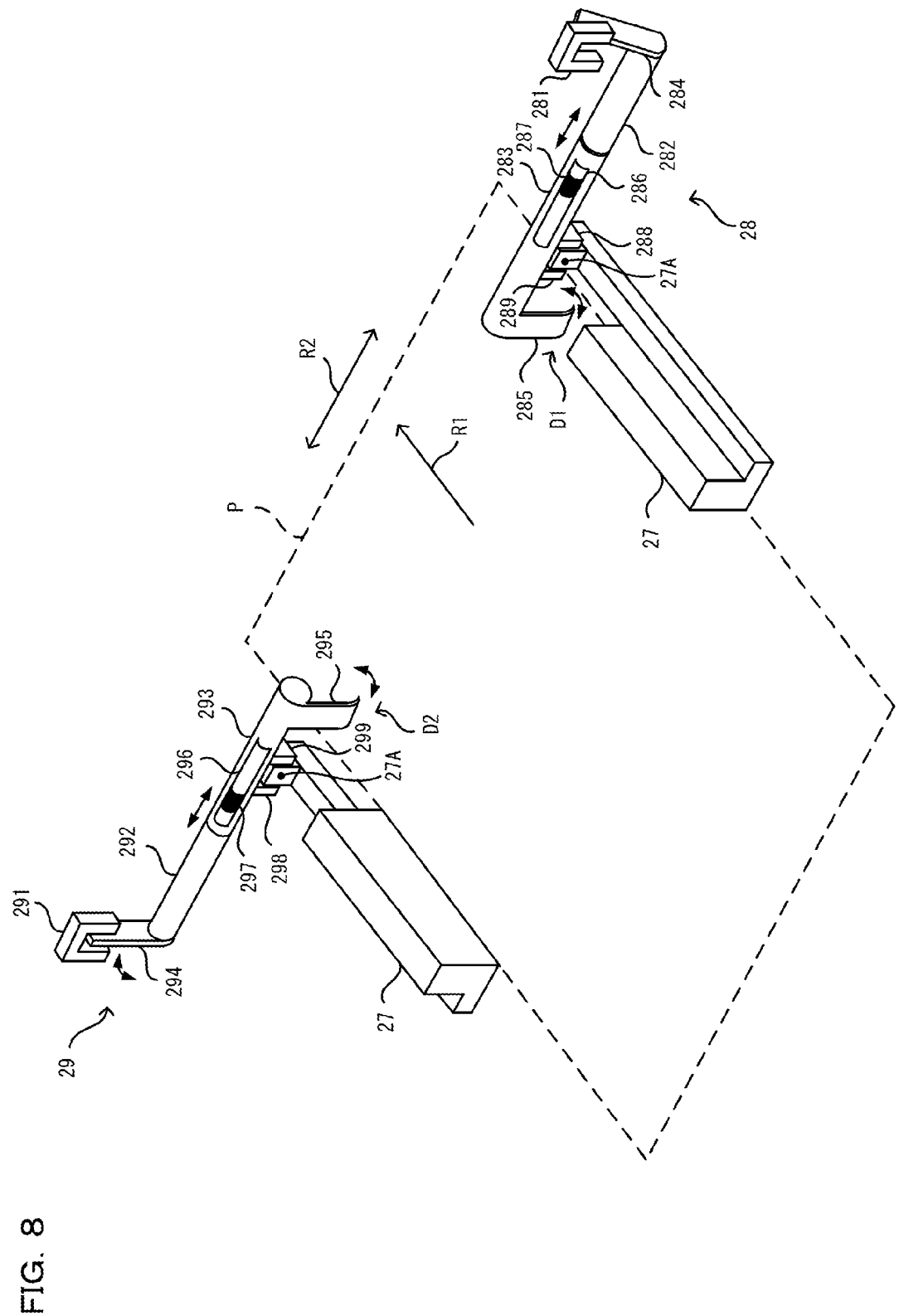
FIG. 8 is a schematic diagram showing another example of the first sensing portion and the second sensing portion included in the multifunction peripheral shown in FIG. 1A.

As shown in FIG. 8, another conceivable embodiment of the ADF 2 is a configuration in which the rotational portions 282 and 283, and the rotational portions 292 and 293 are disposed on a side of the sheet placement portion 21, and the optical sensor 281 and the optical sensor 291 are disposed on a side of the cover member 26. Also with this configuration, when the cover member 26 is open, the optical sensor 281 and the optical sensor 291 are separated from the light-blocking portion 284 and the light-blocking portion 294. In addition, with this configuration, the connection portions 27A of the respective guide members 27 are maintained as being fitted between the rib 288 and the rib 289, and between the rib 298 and the rib 299. Thus, it becomes possible to omit a locking mechanism for restricting movement of each of the guide members 27, the rotational portion 293, and the rotational portion 283 when opening and closing the cover member 26.

In the aforementioned embodiments, although an example has been described in which the first and second sensing positions D1 and D2 change in accordance with movement of the guide members 27, the present disclosure is not limited thereto. More specifically, the first and second sensing positions D1 and D2 may be fixed positions determined in advance. For example, the first and second sensing positions D1 and D2 may conceivably be within a range of the width direction R2 for handling a minimum size of the document sheet P that can be conveyed by the ADF 2.

Furthermore, in the aforementioned embodiments, although the ADF 2 has been described as one example of the sheet conveying device of the present disclosure, the present disclosure is not limited thereto. For example, the present disclosure can be applied to a sheet conveying device configured to convey a sheet such as a paper, a film, or the like, in which an image is formed by the image forming portion 3 included in the multifunction peripheral 10. More specifically, a manual feed tray for supplying a sheet to the image forming portion 3 may conceivably correspond to the sheet placement portion according to the present disclosure. In this case, the first sensing portion 28 and the second sensing portion 29 are disposed on the manual feed tray and the cover member disposed on the image forming portion 3 in an openable/closable manner. With this, the control portion 5 can sense the open state of the cover member and the tilt of a sheet conveyed from the manual feed tray. Thus, it is possible to prevent paper jamming caused by, for example, the sheet being conveyed in a tilted manner.

In the aforementioned embodiments, an example has been described in which the tilt of the document sheet P is sensed in accordance with the lag amount of the timing at which the back end of the document sheet P passes through the contact portion 285 and the contact portion 295. However, the present disclosure is not limited thereto. For example, it is conceivable to dispose the first sensing portion 28 and the second sensing portion 29 at positions where the document sheet P is not sensed when the document sheet P is placed properly on the sheet placement portion 21 but where the document sheet P is sensed when conveying of the document sheet P has started by the sheet feed roller 22. In this case, the control portion 5 can sense the tilt of the document sheet P in accordance with the lag amount of the timing at which the front end of the document sheet P passes through the contact portion 285 and the contact portion 295.

In the aforementioned embodiments, a configuration has been described in which parts that are the targets of sensing by the first sensing portion 28 and the second sensing portion 29 are the same in the conveying direction R1, i.e., the positions of the contact portion 285 of the first sensing portion 28 and the contact portion 295 of the second sensing portion 29 are the same in the conveying direction R1. On the other hand, it is also conceivable to have different positions for the contact portion 285 of the first sensing portion 28 and the contact portion 295 of the second sensing portion 29 in the conveying direction R1. For example, the first sensing portion 28 and the second sensing portion 29 may conceivably be formed such that the contact portion 295 is arranged upstream of the contact portion 285 in the conveying direction R1. In this case, although the open state of the cover member 26 is temporarily sensed when the document sheet P is placed on the sheet placement portion 21, the open state of the cover member 26 and the tilt of the document sheet P can then be sensed in accordance with a combination of the sensing results from the first sensing portion 28 and the second sensing portion 29. For the purpose of preventing the open state of the cover member 26 being temporarily sensed when the document sheet P is placed on the sheet placement portion 21, it is conceivable to have the control portion 5 determine that the cover member 26 is in the open state under a condition in which the open state of the cover member 26 being continuously sensed for a predetermined time set in advance. The first sensing portion 28 and the second sensing portion 29 may conceivably be formed such that the contact portion 285 is arranged upstream of the contact portion 295 in the conveying direction R1. In this case, the open state of the cover member 26 is sensed between passing of the contact portion 285 and passing of the contact portion 295 by the back end of the document sheet P. Thus, the control portion 5 may conceivably determine that the cover member 26 is in the open state under a condition in which the open state of the cover member 26 being continuously sensed for a predetermined time set in advance in accordance with the conveying velocity of the ADF 2 as the time the document sheet P moves from the contact portion 285 to the contact portion 295. It should be noted that, in these configurations, the control portion 5 may conceivably not determine, as an error, a case where the sense signals from the first sensing portion 28 and the second sensing portion 29 are both the OFF-signals.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A sheet conveying device comprising:
    a sheet placement portion on which a sheet is to be placed;
    a conveyance member configured to convey a sheet placed on the sheet placement portion;
    an openable-and-closable cover member configured to cover the conveyance member;
    a first sensing portion configured to output a first sense signal when the sheet is absent at a first sensing position determined in advance on the sheet placement portion, output a second sense signal when the sheet is present at the first sensing position, and output the first sense signal in response to an open state of the cover member;
    a second sensing portion configured to output the second sense signal when the sheet is absent at a second sensing position separated from the first sensing position in a width direction perpendicular to a conveying direction of the sheet, output the first sense signal when the sheet is present at the second sensing position, and output the first sense signal in response to an open state of the cover member; and
    a sensing control portion configured to sense the open state of the cover member and a tilt of the sheet conveyed by the conveyance member, based on a combination of the first sense signal and the second sense signal outputted from the first sensing portion and the second sensing portion.

2. The sheet conveying device according to claim 1, wherein:
    the first sensing portion includes
    a first optical sensor disposed on either one of the sheet placement portion and the cover member, and a first drive portion disposed on the other one thereof and configured to block light to the first optical sensor when being moved by a contact with the sheet placed at the first sensing position; and
    the second sensing portion includes
    a second optical sensor disposed on either one of the sheet placement portion and the cover member, and a second drive portion disposed on the other one thereof and configured to remove blocking of light to the second optical sensor when being moved by a contact with the sheet placed at the second sensing position.

3. The sheet conveying device according to claim 2, further comprising:
    guide members disposed on the sheet placement portion so as to be movable in the width direction of the sheet and configured to guide the sheet conveyed by the conveyance member; and
    a connection portion configured to move, in the width direction of the sheet, a position of a contact portion between the sheet and one or both of the first drive portion and the second drive portion in a manner linked with the guide members.

4. The sheet conveying device according to claim 1, wherein the sensing control portion determines that the sheet is placed properly on the sheet placement portion when the second sense signal is outputted from the first sensing portion and the first sense signal is outputted from the second sensing portion.

5. The sheet conveying device according to claim 1, wherein the sensing control portion senses a tilt of the sheet based on a lag amount of timing at which each of the sense signals from the first sensing portion and the second sensing portion has changed after conveying of the sheet by the conveyance member has started.

6. The sheet conveying device according to claim 5, wherein, after conveying of the sheet by the conveyance member has started, the sensing control portion senses an open state of the cover member when the first sense signal is outputted from both the first sensing portion and the second sensing portion, and then when any one of the sense signals from the first sensing portion and the second sensing portion did not change within a time period set in advance.

7. An image reading apparatus comprising the sheet conveying device according to claim 1, and an image reading portion configured to read image data from a sheet conveyed by the sheet conveying device.

8. An image forming apparatus comprising the sheet conveying device according to claim 1, and an image forming portion configured to form an image based on image data.

9. A sheet conveying device comprising:
    a sheet placement portion on which a sheet is to be placed;
    a conveyance member configured to convey a sheet placed on the sheet placement portion;
    a first sensing portion configured to output a first sense signal when the sheet is absent at a first sensing position determined in advance on the sheet placement portion, and output a second sense signal when the sheet is present at the first sensing position;
    a second sensing portion configured to output the second sense signal when the sheet is absent at a second sensing position separated from the first sensing position in a width direction perpendicular to a conveying direction of the sheet, and output the first sense signal when the sheet is present at the second sensing position; and
    a sensing control portion configured to sense a plurality of states in accordance with a combination of the first sense signal and the second sense signal outputted from the first sensing portion and the second sensing portion.

10. An image reading apparatus comprising the sheet conveying device according to claim 9, and an image reading portion configured to read image data from a sheet conveyed by the sheet conveying device.

11. The image reading apparatus according to claim 10, further comprising a rotation correction portion configured to rotate a content of the image data read by the image reading portion in accordance with a tilt of the sheet sensed by the sensing control portion.

12. An image forming apparatus comprising the sheet conveying device according to claim 9, and an image forming portion configured to form an image based on image data.

* * * * *